US011215260B2

United States Patent
Ito et al.

(10) Patent No.: US 11,215,260 B2
(45) Date of Patent: Jan. 4, 2022

(54) VARIABLE STIFFNESS VIBRATION DAMPING DEVICE

(71) Applicant: HONDA MOTOR CO., LTD., Tokyo (JP)

(72) Inventors: Yuho Ito, Wako (JP); Toshio Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 92 days.

(21) Appl. No.: 16/800,847

(22) Filed: Feb. 25, 2020

(65) Prior Publication Data
US 2020/0271187 A1    Aug. 27, 2020

(30) Foreign Application Priority Data
Feb. 27, 2019  (JP) .............................. JP2019-034952

(51) Int. Cl.
*F16F 9/34*    (2006.01)
*F16F 9/53*    (2006.01)
(Continued)

(52) U.S. Cl.
CPC .......... *F16F 9/3485* (2013.01); *F16F 9/3481* (2013.01); *F16F 9/53* (2013.01); *F16F 2222/06* (2013.01); *F16F 2228/066* (2013.01)

(58) Field of Classification Search
CPC .......... F16F 9/3485; F16F 9/3481; F16F 9/53; F16F 2222/06; F16F 2228/066;
(Continued)

(56) References Cited

U.S. PATENT DOCUMENTS 3,947,007 A * 3/1976 Pelat ..................... F16F 13/08
                                                    267/140.13
4,432,441 A * 2/1984 Kurokawa .............. F16F 6/005
                                                    188/267
(Continued)

FOREIGN PATENT DOCUMENTS

FR        2634530 A1    1/1990
JP     2004263783 A     9/2004
(Continued)

OTHER PUBLICATIONS

First Notification of Office Action for Patent Application CN 202010118638.0 dated Jun. 17, 2021; 17 pp.

*Primary Examiner* — Robert A. Siconolfi
*Assistant Examiner* — James K Hsiao
(74) *Attorney, Agent, or Firm* — Armstrong Teasdale LLP

(57) ABSTRACT

A variable stiffness vibration damping device includes a first support member, a second support member, a pair of main elastic members, a partition elastic member, a communication passage, a coil, a yoke, and a magnetic fluid. The second support member includes an axial portion and a pair of outer flanges. The communication passage is provided in one of the first support member and the axial portion such that a first liquid chamber and a second liquid chamber communicate with each other via the communication passage. The communication passage includes a circumferential passage. The coil is wound coaxially with the one of the first support member and the axial portion. The yoke is included in the one of the first support member and the axial portion and forms a magnetic gap overlapping at least partially with the circumferential passage.

8 Claims, 9 Drawing Sheets

(51) Int. Cl.
*B60K 5/12* (2006.01)
*F16F 9/348* (2006.01)

(58) Field of Classification Search
CPC .... F16F 2224/045; F16F 13/305; F16F 13/10; B60K 5/1283; B60K 5/1208; B60K 5/12
USPC .......................... 267/140.13, 140.14, 140.15
See application file for complete search history.

(56) References Cited

U.S. PATENT DOCUMENTS

| | | | | |
|---|---|---|---|---|
| 4,610,420 A * | 9/1986 | Fukushima | ............ | F16F 13/262 180/300 |
| 4,650,170 A * | 3/1987 | Fukushima | ............ | F16F 13/264 188/378 |
| 4,693,455 A * | 9/1987 | Andra | ............ | F16F 13/264 188/379 |
| 4,773,634 A * | 9/1988 | Hamaekers | ............ | F16F 13/106 137/493 |
| 4,793,599 A * | 12/1988 | Ishioka | ............ | F16F 13/264 188/267 |
| 4,936,556 A * | 6/1990 | Makibayashi | ............ | F16F 13/16 267/140.13 |
| 5,060,919 A * | 10/1991 | Takano | ............ | F16F 13/30 267/140.11 |
| 5,165,668 A * | 11/1992 | Gennesseaux | ............ | F16F 13/28 267/140.12 |
| 5,492,312 A * | 2/1996 | Carlson | ............ | B66B 7/044 267/140.14 |
| 5,718,418 A * | 2/1998 | Gugsch | ............ | F16F 7/1011 188/267 |
| 5,820,113 A * | 10/1998 | Laughlin | ............ | F16F 13/26 267/140.15 |
| 5,957,440 A * | 9/1999 | Jones | ............ | F16F 13/26 267/140.14 |
| 5,961,104 A * | 10/1999 | Gennesseaux | ............ | H01F 7/1638 267/140.14 |
| 6,056,279 A * | 5/2000 | Lee | ............ | F16F 13/10 180/300 |
| 6,120,012 A * | 9/2000 | Shibata | ............ | F16F 13/26 267/140.14 |
| 6,325,364 B1 * | 12/2001 | Muramatsu | ............ | F16F 13/268 267/140.14 |
| 6,406,010 B1 * | 6/2002 | Yano | ............ | F16F 13/106 267/140.13 |
| 6,412,761 B1 * | 7/2002 | Baudendistel | ............ | F16F 13/105 267/140.14 |
| 6,422,546 B1 * | 7/2002 | Nemoto | ............ | F16F 13/26 267/140.13 |
| 6,622,995 B2 * | 9/2003 | Baudendistel | ............ | F16F 13/305 267/140.14 |
| 6,644,634 B1 | 11/2003 | Ersoy et al. | | |
| 6,896,109 B2 * | 5/2005 | Kelso | ............ | F16F 9/535 188/267.1 |
| 6,921,067 B2 * | 7/2005 | Gries | ............ | F16F 13/26 267/140.14 |
| 7,070,027 B2 * | 7/2006 | Manecke | ............ | F16F 9/535 188/267 |
| 7,118,100 B2 * | 10/2006 | Tewani | ............ | F16F 13/305 267/140.15 |
| 7,905,470 B2 * | 3/2011 | Kojima | ............ | F16F 13/305 267/140.14 |
| 7,946,561 B2 * | 5/2011 | Nemoto | ............ | F16F 13/26 267/140.14 |
| 8,672,105 B2 * | 3/2014 | Kim | ............ | F16F 13/305 188/267.2 |
| 8,919,748 B2 * | 12/2014 | Urayama | ............ | H02K 41/0356 267/140.14 |
| 9,038,997 B2 * | 5/2015 | Bradshaw | ............ | F16F 13/16 267/292 |
| 9,051,989 B2 * | 6/2015 | Schumann | ............ | F16F 9/537 |
| 9,097,310 B2 * | 8/2015 | Gaspar | ............ | F16F 15/022 |
| 9,212,716 B2 * | 12/2015 | Yoon | ............ | B60K 5/1241 |
| 9,273,751 B2 * | 3/2016 | Setty | ............ | F16F 13/305 |
| 9,322,451 B2 * | 4/2016 | Schumann | ............ | F16F 13/264 |
| 10,150,510 B2 * | 12/2018 | Baluch | ............ | B62D 24/04 |
| 2002/0036372 A1 * | 3/2002 | Goto | ............ | F16F 13/268 267/140.14 |
| 2002/0171186 A1 * | 11/2002 | Baudendistel | ............ | F16F 13/305 267/140.15 |
| 2005/0236750 A1 * | 10/2005 | Freudenberg | ............ | F16F 13/262 267/140.11 |
| 2006/0254871 A1 * | 11/2006 | Murty | ............ | F16D 37/02 192/21.5 |
| 2007/0057421 A1 * | 3/2007 | Nanno | ............ | F16F 13/105 267/140.13 |
| 2009/0079118 A1 * | 3/2009 | Muraoka | ............ | F16F 13/26 267/140.14 |
| 2009/0276098 A1 | 11/2009 | Bodie et al. | | |
| 2012/0242021 A1 * | 9/2012 | Koyama | ............ | F16F 13/103 267/140.14 |
| 2012/0313306 A1 * | 12/2012 | Ueki | ............ | F16F 13/262 267/140.11 |
| 2013/0001842 A1 * | 1/2013 | Kanaya | ............ | F16F 13/106 267/140.13 |
| 2014/0217661 A1 * | 8/2014 | Schumann | ............ | F16F 13/264 267/140.14 |
| 2014/0354381 A1 * | 12/2014 | Kohlhafer | ............ | H01F 7/081 335/179 |
| 2016/0003322 A1 * | 1/2016 | Bradshaw | ............ | F16F 13/10 267/140.13 |
| 2017/0058989 A1 * | 3/2017 | Koyama | ............ | F16F 13/10 |
| 2017/0204935 A1 * | 7/2017 | Yasuda | ............ | F16F 15/022 |
| 2017/0313171 A1 * | 11/2017 | Yoon | ............ | F16F 13/08 |
| 2017/0317552 A1 * | 11/2017 | Kanaya | ............ | H02K 33/16 |
| 2018/0135722 A1 * | 5/2018 | Oniwa | ............ | F16F 13/1409 |
| 2020/0109761 A1 * | 4/2020 | Inoue | ............ | H01F 1/447 |

FOREIGN PATENT DOCUMENTS

| | | |
|---|---|---|
| JP | 2005098312 A | 4/2005 |
| JP | 2005239084 A | 9/2005 |
| JP | 2018112248 A | 7/2018 |

* cited by examiner

VARIABLE STIFFNESS VIBRATION DAMPING DEVICE

TECHNICAL FIELD

The present invention relates to a variable stiffness vibration damping device filled with a magnetic fluid.

BACKGROUND ART

A known liquid filled vibration damping device, which is used for a liquid filled engine mount and the like, includes a first mounting member mounted to a vibration source side, a second mounting member mounted to a vibration receiving side, an insulator (anti-vibration rubber) made of an elastic material such as rubber and interposed between the first mounting member and the second mounting member, a liquid chamber having a wall partially defined by the insulator, a partition member partitioning an inside of the liquid chamber into a primary liquid chamber and a secondary liquid chamber, a diaphragm closing the secondary liquid chamber, and a resonance orifice connecting the primary liquid chamber and the secondary liquid chamber (for example, JP2005-98312A and JP2004-263783A).

When low-amplitude vibrations are generated, the engine mount is required to absorb an internal pressure of the primary liquid chamber and to function as a low dynamic spring. When high-amplitude vibrations having a higher amplitude than the low-amplitude vibrations are generated, the engine mount is required to have high damping characteristics. In the liquid filled vibration damping device disclosed in JP2005-98312A, in order to further improve the function as the low dynamic spring and the high damping characteristics, the partition member is provided with a non-stretchable cloth partition membrane that is loosened in an initial state. On the other hand, in the liquid filled engine mount disclosed in JP2004-263783A, the partition member is composed of a partition plate and a movable membrane. The movable membrane is made of a rubber elastic body, and is bonded to the partition plate by vulcanization so that the movable membrane is integrated with the partition plate.

These liquid filled vibration damping devices damp low-frequency vibrations (for example, vibrations of 0 Hz to 15 Hz) with a high amplitude by utilizing an orifice resonance. On the other hand, these liquid filled vibration damping devices absorb high-frequency vibrations with a low amplitude by deforming the cloth partition membrane or the movable membrane. In these liquid filled vibration damping devices, an amount of a liquid passing through the orifice is adjusted by varying stiffness of the diaphragm, so that a resonance frequency is adjusted.

Also, a so-called active control mount (ACM) is known as an active engine mount (for example, JP2005-239084A). The ACM is provided with an actuator for forcibly vibrating a mass element, so that the ACM can theoretically generate any desired damping force regardless of disturbance working thereon. Therefore, the ACM can realize a high damping effect both in a steady state and in an unsteady state.

However, in the liquid filled vibration damping device disclosed in JP2005-98312A and JP2004-263783A, it is necessary to determine stiffness and damping characteristics of the entire vibration damping device by using parameters such as stiffness and damping characteristics of the anti-vibration rubber, volume of the primary liquid chamber, volume of the secondary liquid chamber, a diameter of the orifice, length of the orifice, stiffness of the membrane, and stiffness of the diaphragm. Accordingly, an adjustment range of the stiffness and the damping characteristics of the entire vibration damping device is narrow, and therefore it is difficult to have desired characteristics at arbitrary frequencies. For example, it is difficult to make adjustments at several frequencies such that the damping characteristics are enhanced when vibrations around 10 Hz that have an influence on riding comfort of an automobile is generated, while the damping characteristics are declined when vibrations around 130 Hz that have an influence on a muffled sound of an engine is generated.

On the other hand, in the ACM, a mechanism for directly inputting external energy thereto becomes complicated. Also, in the ACM, it is necessary to design a control system for avoiding instability and the cost of components thereof is increased.

SUMMARY OF THE INVENTION

In view of such a problem of the prior art, a primary object of the present invention is to provide a variable stiffness vibration damping device that can vary stiffness and damping characteristics as desired with a simple configuration.

To achieve such an object, one embodiment of the present invention provides a variable stiffness vibration damping device (10) including: an annular first support member (11) defining an inner hole (13) therein; a second support member (12) including an axial portion (15) penetrating through the inner hole (13) of the first support member (11) in an axial direction and a pair of outer flanges (16) provided at both ends in the axial direction of the axial portion (15) and spaced from the first support member (11) at a prescribed interval in the axial direction; a pair of annular main elastic members (17) connecting the first support member (11) and each of the pair of outer flanges (16) and defining a liquid chamber (18) around the axial portion (15); an annular partition elastic member (20) connecting an inner circumferential portion of the first support member (11) and an outer circumferential portion of the axial portion (15) and partitioning the liquid chamber (18) into a first liquid chamber (18A) and a second liquid chamber (18B); a communication passage (44) provided in one of the first support member (11) and the axial portion (15) such that the first liquid chamber (18A) and the second liquid chamber (18B) communicate with each other via the communication passage (44), the communication passage (44) including a circumferential passage (41) extending in a circumferential direction; a coil (26) wound coaxially with and provided in the one of the first support member (11) and the axial portion (15); a yoke (38) included in the one of the first support member (11) and the axial portion (15) and configured to form a magnetic gap (40) overlapping at least partially with the circumferential passage (41); and a magnetic fluid (50) filling the first liquid chamber (18A), the second liquid chamber (18B), and the communication passage (44).

According to this arrangement, a magnetic field is generated around the coil by supplying an electric current thereto, and flow resistance of the magnetic fluid in the circumferential passage of the communication passage is varied by lines of magnetic force passing through the circumferential passage. Therefore, stiffness (specifically, stiffness related to displacement of the first support member and the second support member in the axial direction) and damping characteristics in the axial direction of the variable stiffness vibration damping device can be varied as desired by an electric current flowing through the coil. In addition, stiffness and damping characteristics in the axial direction of the variable stiffness vibration damping device can be varied with a simple configuration by providing the one of the first support member and the axial portion with the circumferential passage, the coil, and the yoke.

Preferably, the first support member (11) is provided with the communication passage (44), the coil (26), and the yoke (38).

According to this arrangement, it is possible to lengthen the circumferential passage of the communication passage, compared with a case where the axial portion of the second support member is provided with the communication passage, the coil, and the yoke. Therefore, stiffness and damping characteristics in the axial direction of the variable stiffness vibration damping device can be varied greatly.

Preferably, the circumferential passage (41) is provided in the first support member (11) in a circumferential range larger than 180°.

According to this arrangement, it is possible to lengthen the circumferential passage, and therefore, stiffness and damping characteristics in the axial direction of the variable stiffness vibration damping device can be varied more greatly.

Preferably, the circumferential passage (41) is provided in the first support member (11) in a circumferential range equal to or larger than 360°.

According to this arrangement, it is possible to further lengthen the circumferential passage, and therefore, stiffness and damping characteristics in the axial direction of the variable stiffness vibration damping device can be varied even more greatly.

Preferably, the circumferential passage (41) is located on an outer circumferential side of the coil (26).

According to this arrangement, it is possible to lengthen the circumferential passage, and therefore, stiffness and damping characteristics in the axial direction of the variable stiffness vibration damping device can be varied more greatly.

Preferably, the axial portion (15) has a through hole (8) penetrating therethrough in the axial direction.

According to this arrangement, it is possible to utilize the variable stiffness vibration damping device as a bushing by fastening a member on a vibration source side or a member on a vibration receiving side to the pair of outer flanges of the second support member via a fastening means such as a bolt penetrating through the through hole.

Preferably, the partition elastic member (20) is located at least partially in the inner hole (13) of the first support member (11) and extends in a direction substantially orthogonal to the axial direction.

Preferably, the yoke (38) includes: a passage forming member (35) forming the circumferential passage (41); and a pair of stacked members (36, 37) stacked in the axial direction with the passage forming member (35) therebetween, and magnetic permeability of the passage forming member (35) is lower than that of the pair of stacked members (36, 37).

Thus, according to an embodiment of the present invention, it is possible to provide a variable stiffness vibration damping device that can vary stiffness and damping characteristics as desired with a simple configuration.

DESCRIPTION OF THE PREFERRED EMBODIMENT(S)

In the following, embodiments of the present invention will be described in detail with reference to the drawings.

Figure 1:
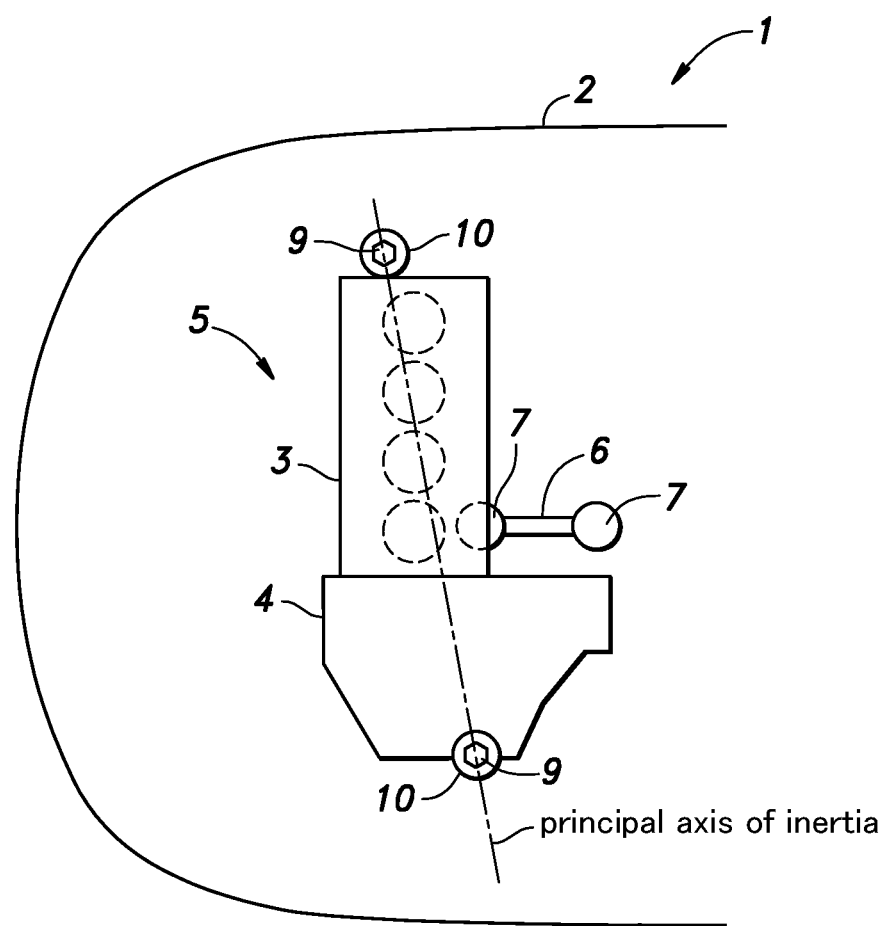
FIG. 1 is a plan view showing variable stiffness vibration damping devices mounted to a vehicle body according to an embodiment of the present invention.

As shown in FIG. 1, an engine 3 is transversely arranged in a front portion of a vehicle body 2 of an automobile 1 (vehicle). A transmission 4 is provided integrally with the engine 3, and a power plant 5 is composed of the engine 3, the transmission 4, and the like. The power plant 5 is supported by the vehicle body 2 via a pair of engine mounts (a side mount and a trans mount) and a torque rod 6. The pair of engine mounts consist of a pair of variable stiffness vibration damping devices 10 (hereinafter simply referred to as "vibration damping devices 10").

The vibration damping devices 10 receive a main load (own weight) of the power plant 5. Each vibration damping device 10 is located on a principal axis of inertia of the whole power plant 5 and is fixed to the vehicle body 2. On the other hand, the torque rod 6 is connected to the engine 3 via a rubber bushing 7 on one longitudinal end thereof, and is connected to the vehicle body 2 via a rubber bushing 7 on another longitudinal end thereof. The torque rod 6 prevents a swing (roll) of the power plant 5 about a roll axis (principal axis of inertia) due to driving torque of the engine 3.

In each vibration damping device 10, a bolt hole 8 (see FIG. 4) is formed along an axis X thereof. A support member (not shown) of the power plant 5 is fastened to each vibration damping device 10 by a bolt 9 (see FIG. 1) screwed into (engaged with) the bolt hole 8. Thereby, the power plant 5 is supported by the vehicle body 2 via each vibration damping device 10.

In the following, one of the vibration damping devices 10 will be described in detail. Hereinafter, an axial direction of the vibration damping device 10 (namely, an extending direction of the bolt hole 8) is defined as a vertical direction based on a mounting posture of the vibration damping device 10 shown in FIG. 1. However, such a definition about the direction does not limit arrangement of the vibration damping device 10.

Figure 2:
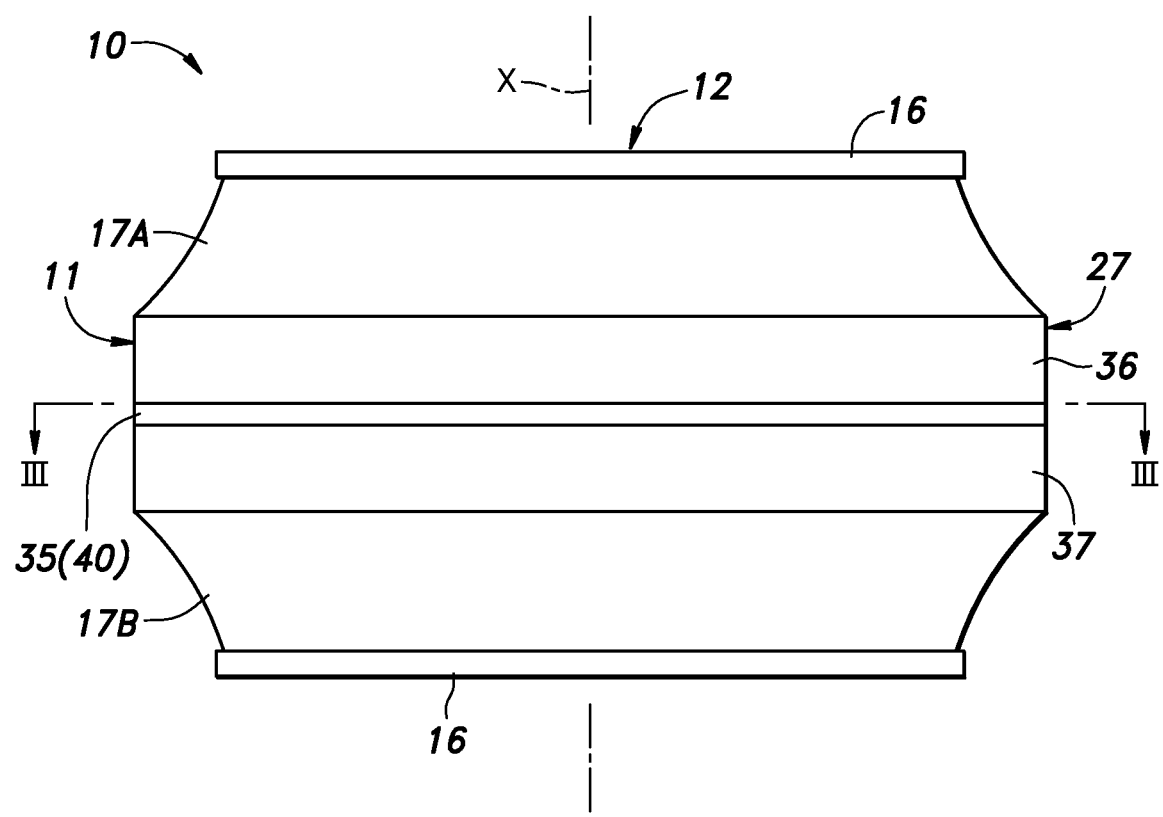
FIG. 2 is a side view of the variable stiffness vibration damping device shown in FIG. 1.
Figure 3:
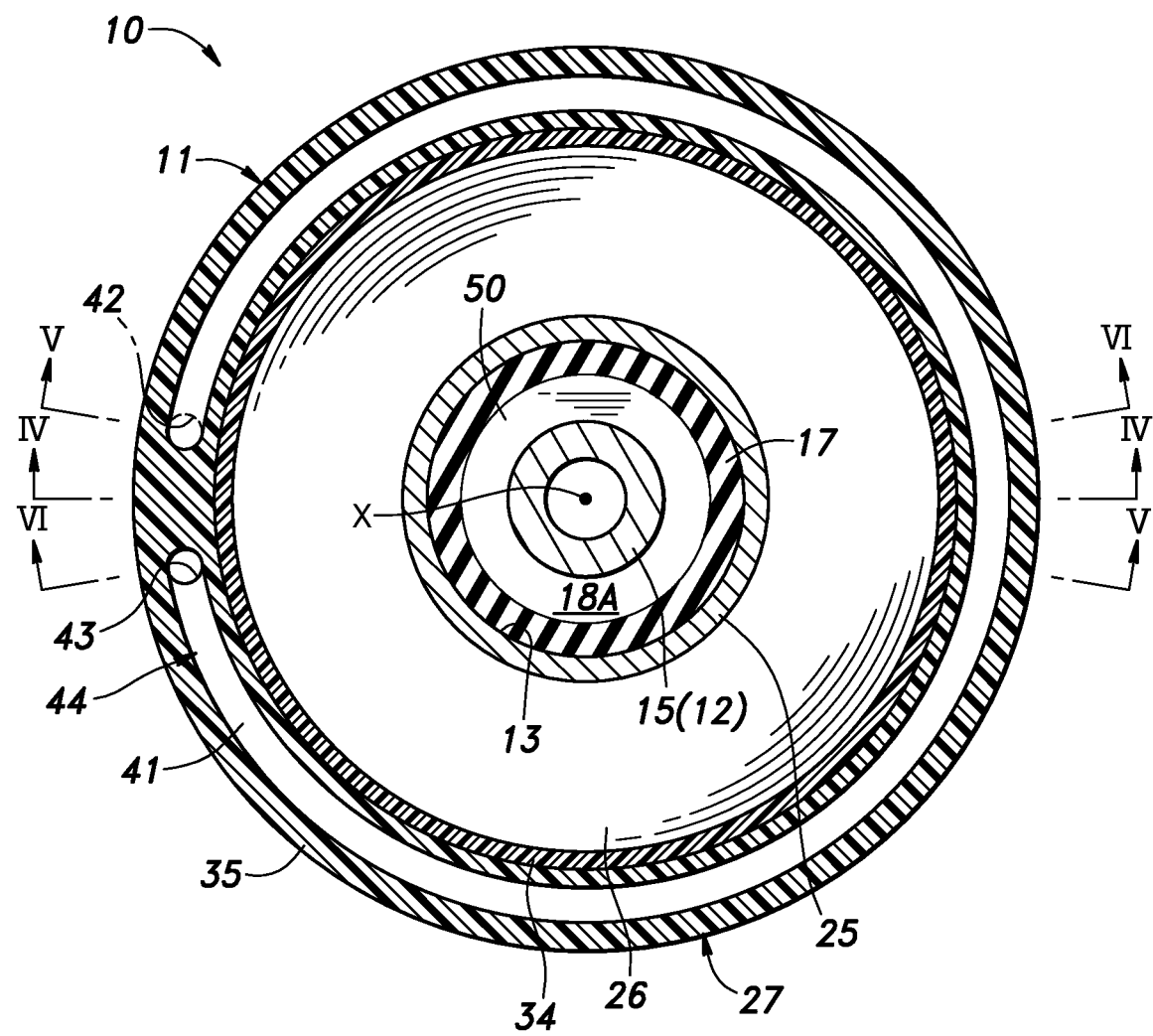
FIG. 3 is a sectional view taken along a line of FIG. 2.
Figure 4:
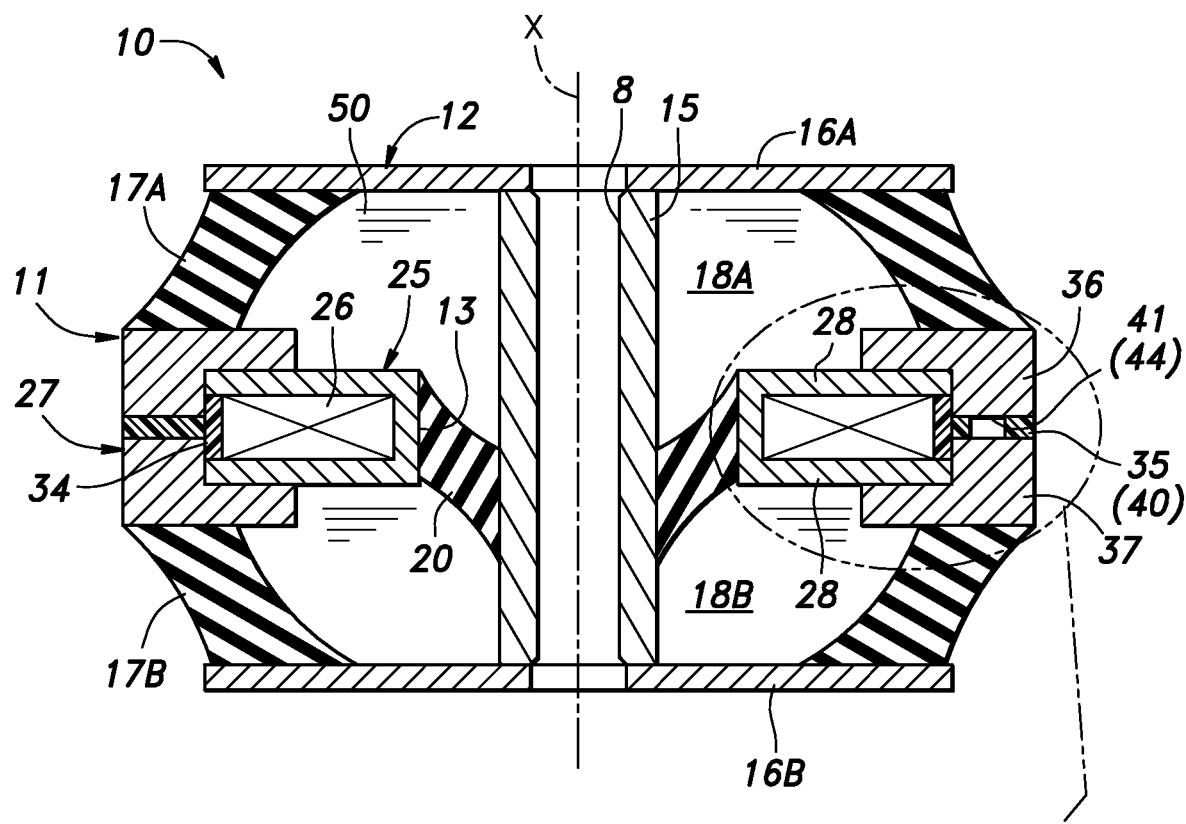
FIG. 4 is a sectional view taken along a line IV-IV of FIG. 3.
Figure 4:
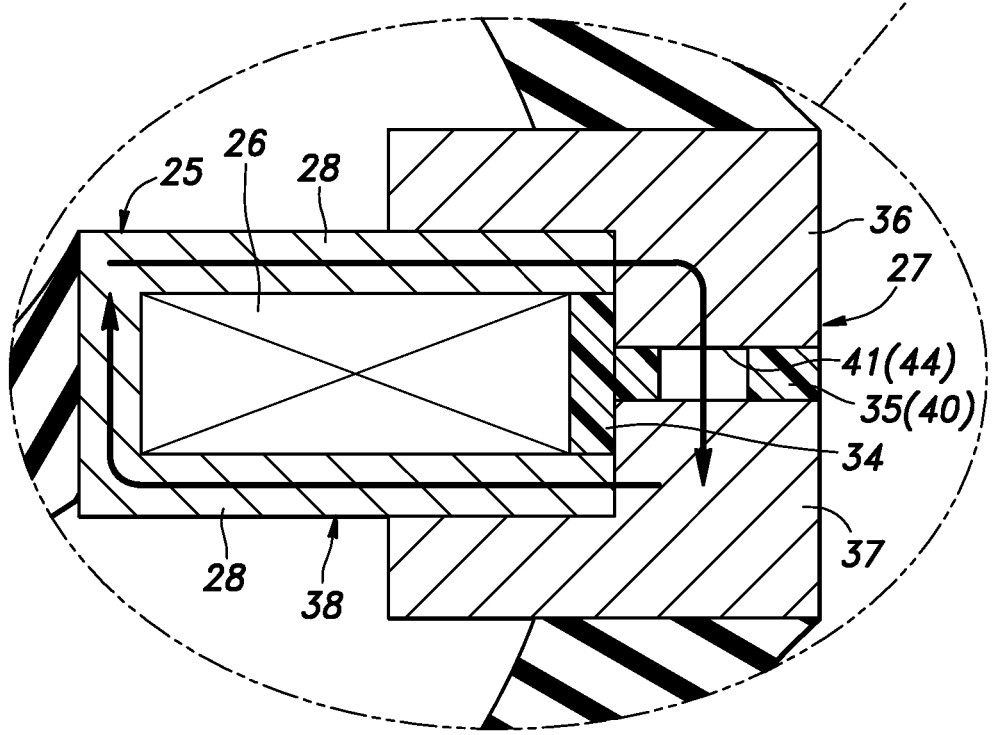

As shown in FIGS. 2 to 4, the vibration damping device 10 includes a first support member 11 mounted to the vehicle body 2 and a second support member 12 to which the power plant 5 is mounted. The first support member 11 has an annular shape and defines a circular inner hole 13 extending in a direction of the axis X (hereinafter referred to as "axial direction"). The second support member 12 defines the above-mentioned bolt hole 8.

As shown in FIG. 4, the second support member 12 includes: an axial portion 15 provided along the axis X; and a pair of outer flanges 16 (upper outer flange 16A and lower outer flange 16B) provided integrally with both ends in the axial direction of the axial portion 15. An outer diameter of the axial portion 15 is smaller than an inner diameter of the first support member 11, and a length in the axial direction of the axial portion 15 is longer than that of the first support member 11. The axial portion 15 penetrates through the inner hole 13 of the first support member 11 in the axial direction. The axial portion 15 has the above-mentioned bolt hole 8 that consists of a through hole (bolt insertion hole) penetrating through the axial portion 15 in the axial direction. Thereby, the axial portion 15 has a cylindrical shape. In other embodiments, the bolt hole 8 may be a bottomed screw hole. Outer diameter of each outer flange 16 is smaller than that of the first support member 11. Each outer flange 16 has a disk-like shape with a through hole formed in the center thereof. Each outer flange 16 is spaced from the first support member 11 at a prescribed interval in the axial direction. The second support member 12 is a rigid member made of metal. For example, the second support member 12 may include a metal having high magnetic permeability such as iron or cobalt, or may include a metal having low magnetic permeability such as aluminum.

An outer circumferential portion of the first support member 11 and an outer circumferential portion of each outer flange 16 of the second support member 12 are connected to each other via a pair of annular main elastic members 17 (upper main elastic member 17A and lower main elastic member 17B). Thereby, a liquid chamber 18 is defined between the first support member 11 and the second support member 12 (i.e. a liquid chamber 18 is defined around the axial portion 15). Each main elastic member 17 is a spring member that absorbs vibrations of the power plant 5, and has a truncated cone shape with an outer diameter of a first side (side of each corresponding outer flange 16) smaller than that of a second side (side of the first support member 11). Each main elastic member 17 is made of an elastic material such as elastomer or rubber. When the second support member 12 receives a load or vibrations of the power plant 5 and thereby vibrates in the axial direction with respect to the first support member 11, one of the pair of main elastic members 17 contracts in the axial direction and another of the pair of main elastic members 17 expands in the axial direction to keep a volume of the liquid chamber 18 constant.

A partition elastic member 20 is partially located in the inner hole 13 of the first support member 11. The partition elastic member 20 extends in a direction substantially orthogonal to the axial direction, and partitions the liquid chamber 18 into a first liquid chamber 18A and a second liquid chamber 18B. The first liquid chamber 18A is formed between the partition elastic member 20 and the upper main elastic member 17A, while the second liquid chamber 18B is formed between the partition elastic member 20 and the lower main elastic member 17B. That is, the first liquid chamber 18A is on a side of the upper main elastic member 17A and partially defined by the upper main elastic member 17A, while the second liquid chamber 18B is on a side of the lower main elastic member 17B and partially defined by the lower main elastic member 17B. The partition elastic member 20 is made of an elastic material such as elastomer or rubber and has a substantially cylindrical shape. An outer circumferential portion of the partition elastic member 20 is coupled to an inner circumferential face of the first support member 11, and an inner circumferential portion of the partition elastic member 20 is coupled to an outer circumferential face of the axial portion 15 of the second support member 12.

The partition elastic member 20 is formed integrally with the first support member 11 and the axial portion 15 of the second support member 12 by pouring unvulcanized rubber into a mold in which the first support member 11 and the second support member 12 are arranged at prescribed positions and then vulcanizing the rubber.

After the partition elastic member 20 is formed, the pair of main elastic members 17 are formed integrally with the first support member 11 and the pair of outer flanges 16 by pouring unvulcanized rubber into a mold in which the first support member 11 and the second support member 12 are integrally arranged at prescribed positions and then vulcanizing the rubber.

The first support member 11 includes an annular inner yoke 25, a coil 26, and an annular outer yoke 27. The inner yoke 25 is provided in an inner circumferential portion of the first support member 11. The coil 26 is coaxially wound around an outer circumference of the inner yoke 25. The outer yoke 27 is provided in an outer circumferential portion of the first support member 11. The outer yoke 27 is integrated with the inner yoke 25 and surrounds the coil 26 in cooperation with the inner yoke 25.

A pair of outer flange portions 28 that accommodate the coil 26 are formed integrally with upper and lower ends of the inner yoke 25. The pair of outer flange portions 28 compose an upper yoke and a lower yoke.

The coil 26 is formed by winding a coated copper wire around the inner yoke 25 between the pair of outer flange portions 28. Both ends of the coated copper wire, which function as lead wires, are drawn out of the vibration damping device 10. The outer diameter of the coil 26 is smaller than that of each outer flange portion 28. A cylindrical spacer 34 is provided on an outer circumferential side of the coil 26. Upper and lower ends of the spacer 34 abut against outer circumferential portions of the pair of outer flange portions 28. A drawing hole (not shown) is formed in the outer yoke 27, and both ends of the coated copper wire are drawn out of the vibration damping device 10 through the drawing hole.

The outer yoke 27 includes an outer passage forming member 35, an upper outer yoke 36, and a lower outer yoke 37. The outer passage forming member 35 is arranged at an intermediate portion in the axial direction of the outer yoke 27. The upper outer yoke 36 and the lower outer yoke 37 (a pair of stacked members) are stacked in the axial direction with the outer passage forming member 35 therebetween. The upper outer yoke 36 and the lower outer yoke 37 are joined to the outer passage forming member 35 in a state where an outer circumferential portion of the inner yoke 25 is interposed between the upper outer yoke 36 and the lower outer yoke 37. Thereby, the outer yoke 27 is coupled to the inner yoke 25. The inner yoke 25 and the outer yoke 27 compose a yoke 38 (see an enlarged view of FIG. 4) surrounding the coil 26.

The inner yoke 25, the upper outer yoke 36, and the lower outer yoke 37 are made of a metal having high magnetic permeability, and specifically, include a ferromagnetic metal such as iron and cobalt. In the present embodiment, the inner yoke 25, the upper outer yoke 36, and the lower outer yoke 37 are made of iron. The spacer 34 and the outer passage forming member 35 are rigid members made of a non-magnetic metal or resin having a lower magnetic permeability than the metal constituting the inner yoke 25, the upper outer yoke 36, and the lower outer yoke 37. For example, the spacer 34 and the outer passage forming member 35 are made of aluminum (in the drawings, resinous hatching is applied to these members so that these members are easily understood).

The outer passage forming member 35 is made of a non-magnetic material, and thereby an annular magnetic gap 40 is formed in the yoke 38, which is formed around the coil 26 by the inner yoke 25 and the outer yoke 27. The outer passage forming member 35 is provided in an outer circumference of the coil 26, and thereby the magnetic gap 40 is provided in the outer circumference of the coil 26.

As shown in FIG. 3, the outer passage forming member 35 forms a circumferential passage 41 extending in the circumferential direction for an angle larger than 180°. In the present embodiment, the circumferential passage 41 extends in the circumferential direction for about 350° (an angle smaller than 360°). The circumferential passage 41 consists of a slot penetrating through the outer passage forming member 35.

Figure 5:
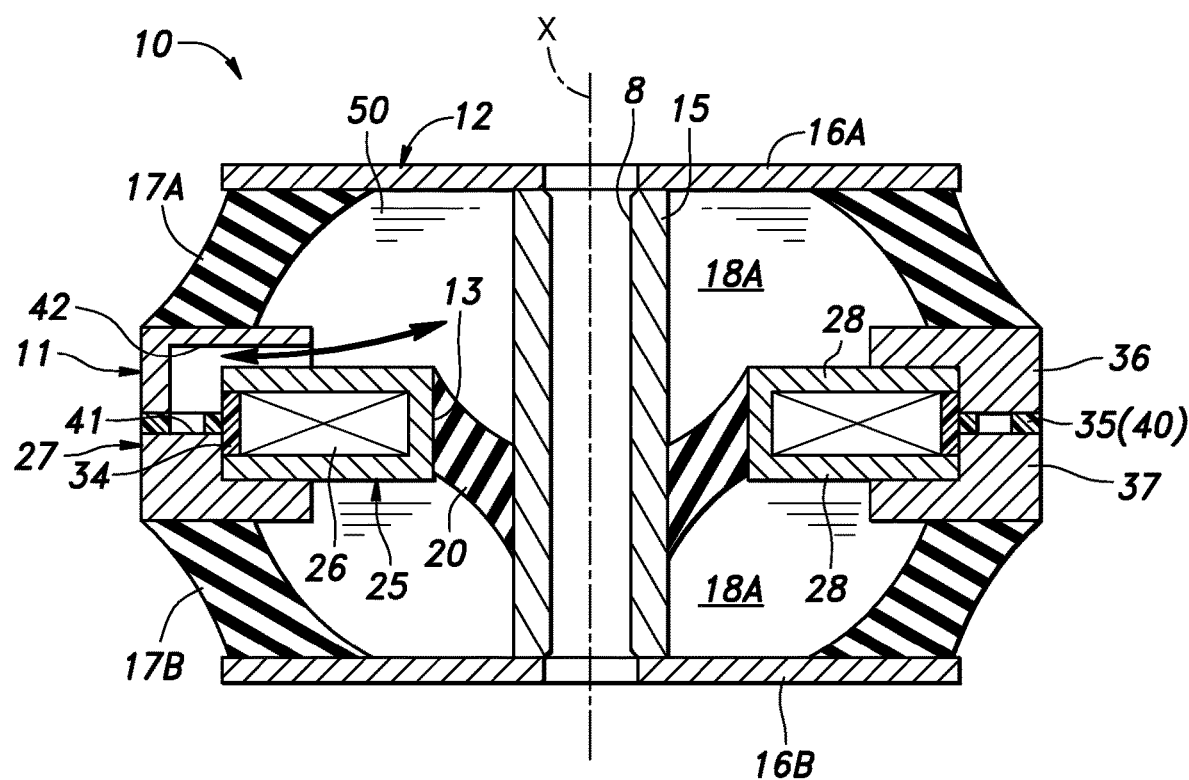
FIG. 5 is a sectional view taken along a line V-V of FIG. 3.
Figure 6:
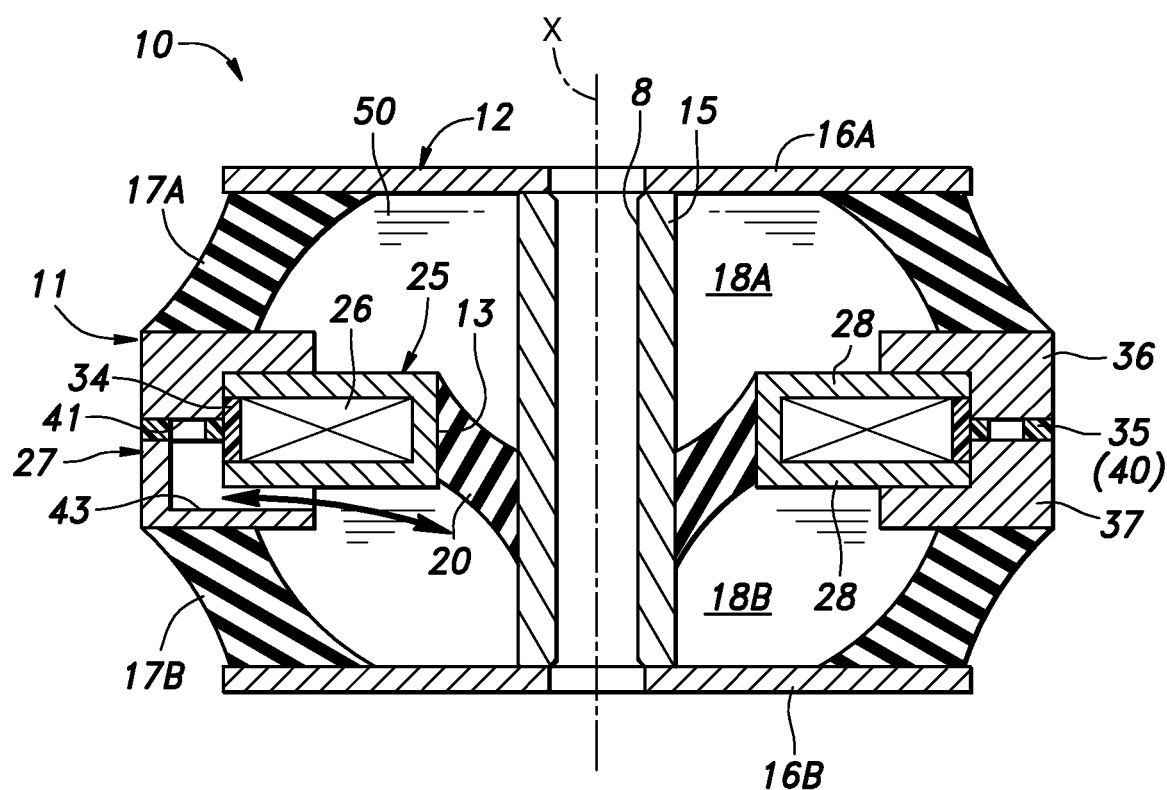
FIG. 6 is a sectional view taken along a line VI-VI of FIG. 3.

As shown in FIGS. 3, 5 and 6, a first communication port 42 is provided at one end of the circumferential passage 41. The first communication port 42 is formed in the upper outer yoke 36 such that the circumferential passage 41 and the first liquid chamber 18A communicate with each other via the first communication port 42. A second communication port 43 is provided at another end of the circumferential passage 41. The second communication port 43 is formed in the lower outer yoke 37 such that the circumferential passage 41 and the second liquid chamber 18B communicate with each other via the second communication port 43. The circumferential passage 41, the first communication port 42, and the second communication port 43 compose a communication passage 44 via which the first liquid chamber 18A and the second liquid chamber 18B communicate with each other. The communication passage 44 is formed in the outer yoke 27 of the first support member 11. The magnetic gap 40 formed in the outer yoke 27 by the outer passage forming member 35 includes a portion (gap) overlapping with the circumferential passage 41.

The first liquid chamber 18A, the second liquid chamber 18B, and the communication passage 44 are filled with a magnetic fluid 50. The magnetic fluid 50 is an incompressible fluid containing iron particles dispersed in a solvent such as an oil, and preferably consists of a magneto-rheological fluid (MRF) or a magneto-rheological compound (MRC) that can change viscoelasticity (particularly, viscosity) depending on an applied magnetic field. In the present embodiment, the MRC is used as the magnetic fluid 50. When a magnetic field is applied to the magnetic fluid 50, the iron particles therein are aligned along the direction of the magnetic field to form chain-like clusters. Thereby, the chain-like clusters hinder a flow of the solvent in the direction orthogonal to the magnetic field, whereby the viscosity of the magnetic fluid 50 increases and the magnetic fluid 50 is semi-solidified.

Next, operation of the vibration damping device 10 according to the present embodiment will be described. As shown in FIG. 4, when the second support member 12 is displaced vertically with respect to the first support member 11, one of the pair of main elastic members 17 contracts vertically and another of the pair of main elastic members 17 expands vertically. Thus, the volume of the first liquid chamber 18A and that of the second liquid chamber 18B change in an opposite relationship. That is, as the volume of one of the first liquid chamber 18A and the second liquid chamber 18B decreases, the volume of another of the first liquid chamber 18A and the second liquid chamber 18B increases. In response to these changes in the volumes, as shown in FIGS. 5 and 6, the magnetic fluid 50 filling the one of the first liquid chamber 18A and the second liquid chamber 18B moves to another of the first liquid chamber 18A and the second liquid chamber 18B via the communication passage 44. At this time, resistance is applied to the magnetic fluid 50 flowing in the communication passage 44, and thereby the vibrations applied to the vibration damping device 10 are damped.

When a voltage is applied to both ends of the coated copper wire composing the coil 26, a magnetic field is generated around the coil 26 by an electric current flowing therethrough. Arrows in the enlarged view of FIG. 4 indicate lines of magnetic force corresponding to the magnetic field generated by the coil 26. A magnetic circuit is formed by the inner yoke 25 and the outer yoke 27 of the first support member 11, and the magnetic field concentrates in the circumferential passage 41 of the communication passage 44.

By applying the magnetic field to the circumferential passage 41, viscosity of the magnetic fluid 50 in the communication passage 44 increases. Accordingly, the resistance applied to the magnetic fluid 50 flowing in the communication passage 44 increases, so that a damping force against vertical vibrations applied to the vibration damping device 10 increases. Also, by increasing the resistance applied to the magnetic fluid 50 flowing in the communication passage 44, the second support member 12 becomes less likely to move vertically with respect to the first support member 11, so that vertical stiffness of the vibration damping device 10 is increased. As described above, by controlling the voltage applied to the coil 26, the damping force of the vibration damping device 10 against the vertical vibrations can be controlled.

Next, the effect of the vibration damping device 10 will be described. The vibration damping device 10 can vary viscosity of the magnetic fluid 50 by supplying an electric current to the coil 26, so that stiffness of the vibration damping device 10 can be varied. To vary stiffness of the vibration damping device 10 effectively, it is desirable that a magnetic field generated in the coil 26 concentrate in a flowing passage of the magnetic fluid 50.

In the present embodiment, as shown in FIG. 4, the coil 26 is wound coaxially with and provided in the first support member 11, and the yoke 38 is provided in the first support member 11 such that the yoke 38 forms the magnetic gap 40 overlapping at least partially (namely, partially or entirely) with the circumferential passage 41. Accordingly, a magnetic field generated around the coil 26 by supplying an electric current thereto concentrates in the circumferential passage 41, and flow resistance of the magnetic fluid 50 in the circumferential passage 41 is varied. Therefore, stiffness (specifically, stiffness related to displacement of the first support member 11 and the second support member 12 in the axial direction) and damping characteristics in the axial direction of the vibration damping device 10 can be varied as desired by an electric current flowing through the coil 26. In addition, stiffness and damping characteristics in the axial direction of the vibration damping device 10 can be varied with a simple configuration by providing the first support member 11 with the circumferential passage 41, the coil 26, and the yoke 38.

Also, the first support member 11 is provided with the communication passage 44, the coil 26, and the yoke 38.

Accordingly, it is possible to lengthen the circumferential passage 41 of the communication passage 44, compared with a case where the axial portion 15 of the second support member 12 is provided with these members. Therefore, stiffness and damping characteristics in the axial direction of the vibration damping device 10 can be varied greatly.

Also, the circumferential passage 41 is provided in the first support member 11 in a circumferential range larger than 180°. Accordingly, it is possible to lengthen the circumferential passage 41, and therefore, stiffness and damping characteristics in the axial direction of the vibration damping device 10 can be varied more greatly.

Also, the circumferential passage 41 is located on an outer circumferential side of the coil 26. Accordingly, it is possible to lengthen the circumferential passage 41, and therefore, stiffness and damping characteristics in the axial direction of the vibration damping device 10 can be varied more greatly.

In the present embodiment, the axial portion 15 has the bolt hole 8 that consists of a through hole penetrating therethrough in the axial direction. Accordingly, it is possible to fasten either the power plant 5 on a vibration source side or the vehicle body 2 on a vibration receiving side to the pair of outer flanges 16 of the second support member 12 via a fastening means such as the bolt 9 penetrating through the bolt hole 8. Also, it is possible to utilize the vibration damping device 10 as a bushing.

Figure 7A:
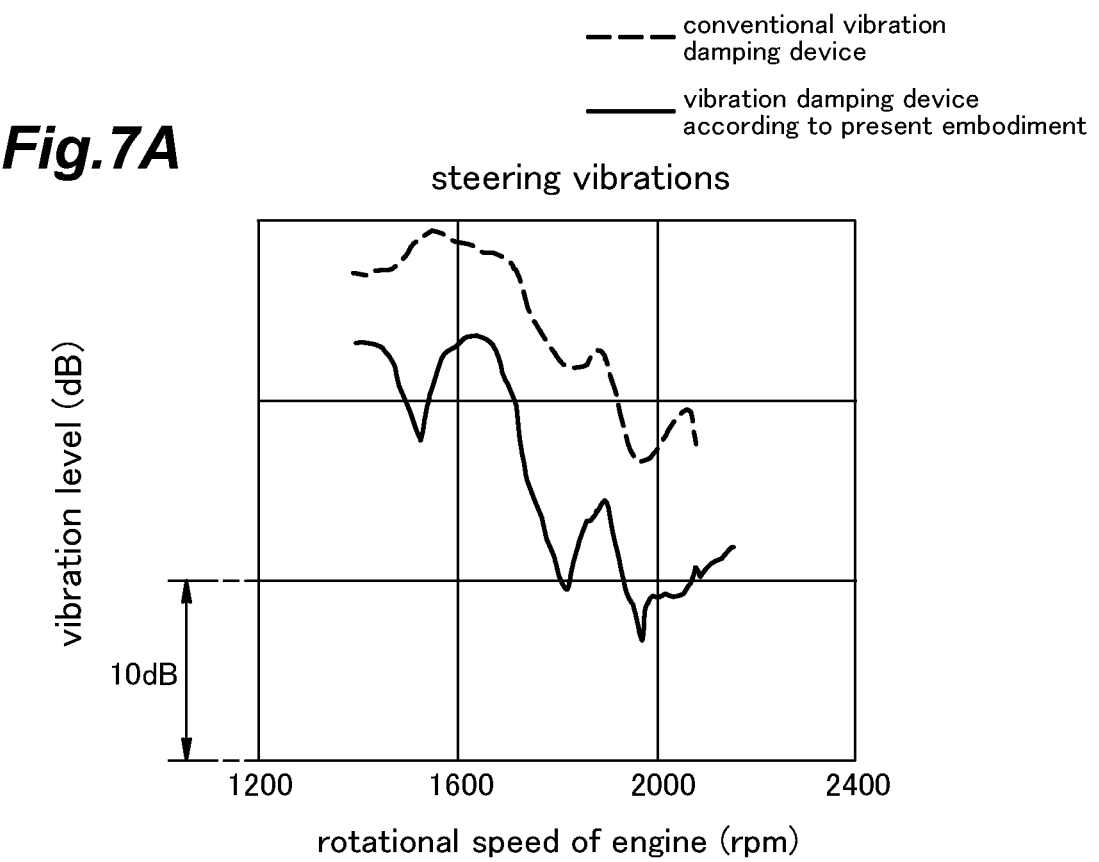
FIG. 7A is a graph showing a vibration level of steering vibrations.
Figure 7B:
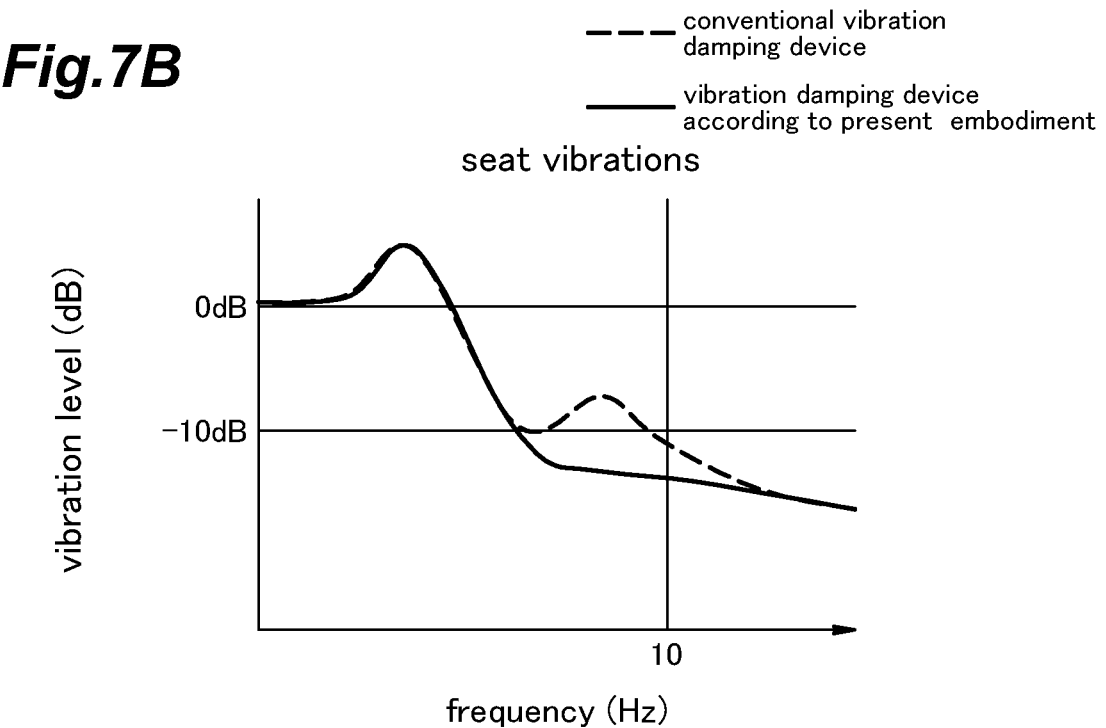
FIG. 7B is a graph showing a vibration level of seat vibrations.

FIGS. 7A and 7B are graphs each showing a vibration level depending on a control state of the vibration damping device 10 according to the present embodiment, which is used as the engine mount. FIG. 7A shows a vibration level of steering vibrations (vibrations generated in a steering wheel) during acceleration of the automobile 1. FIG. 7B shows a vibration level (displacement gain of a road surface) of seat vibrations (vibrations generated in a seat) during acceleration of the automobile 1. In FIGS. 7A and 7B, the vertical axis of the graph represents a vibration level. In FIG. 7A, the horizontal axis of the graph represents a rotational speed of an engine. In FIG. 7B, the horizontal axis of the graph represents a frequency.

As shown in FIG. 7A, with regard to the vibrations generated in the steering wheel during acceleration of the automobile 1, the vibration level is reduced over an entire normal use range of the rotational speed of the engine in a case where the vibration damping device 10 according to the present embodiment is used in a low stiffness state, compared with a case where a conventional vibration damping device with high stiffness is used. Also, as shown in FIG. 7B, with regard to the vibrations generated in the seat during acceleration of the automobile 1, the vibration level is reduced in a frequency range around 10 Hz in a case where the vibration damping device 10 according to the present embodiment is used in a low stiffness state, compared with a case where a conventional vibration damping device with high stiffness is used.

Figure 8:
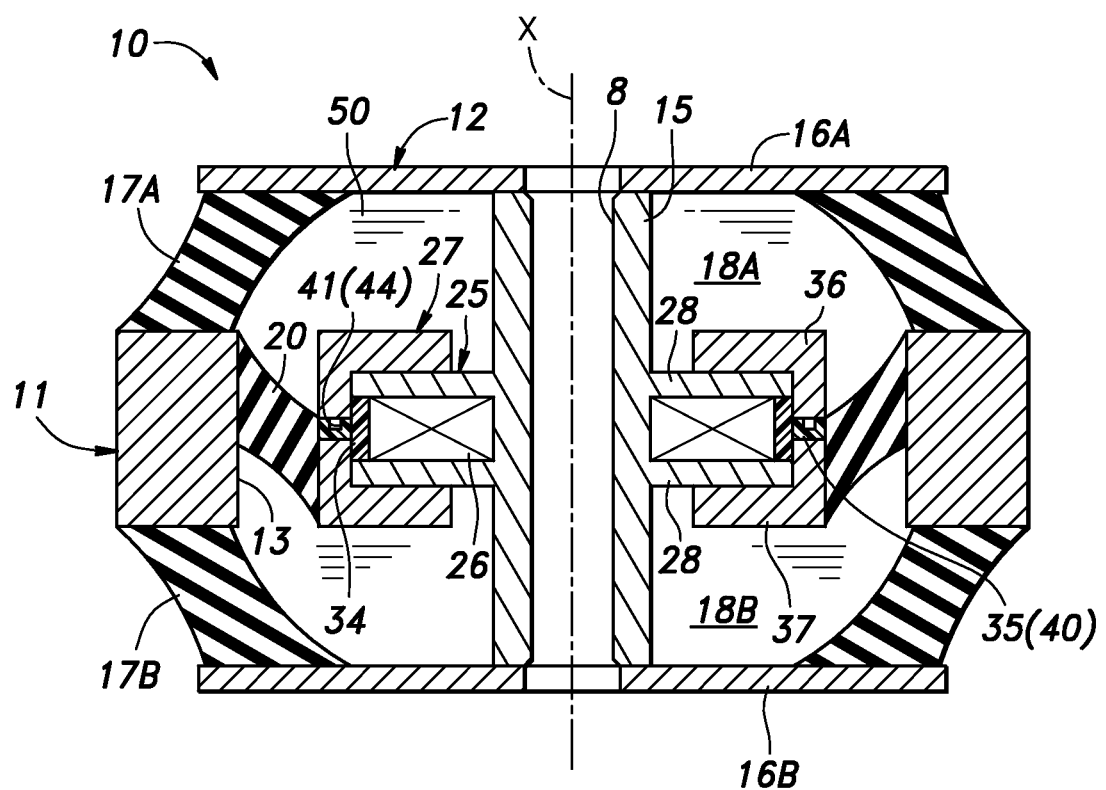
FIG. 8 is a sectional view, in a section corresponding to FIG. 4, of a variable stiffness vibration damping device according to another embodiment of the present invention.

Concrete embodiments of the present invention have been described in the foregoing, but the present invention should not be limited by the foregoing embodiments and various modifications and alterations are possible within the scope of the present invention. For example, in the above embodiments, the entirety of the first support member 11 composes the yoke 38. On the other hand, in other embodiments, the yoke 38 may be provided in any portion of the first support member 11 or the axial portion 15 of the second support member 12. Thus, the first support member 11 or the second support member 12 may include a portion made of a metal having low magnetic permeability. Also, in other embodiments, as shown in FIG. 8, the coil 26, the communication passage 44 including the circumferential passage 41, and the like may be provided not in the first support member 11 but in the axial portion 15 of the second support member 12.

Figure 9:
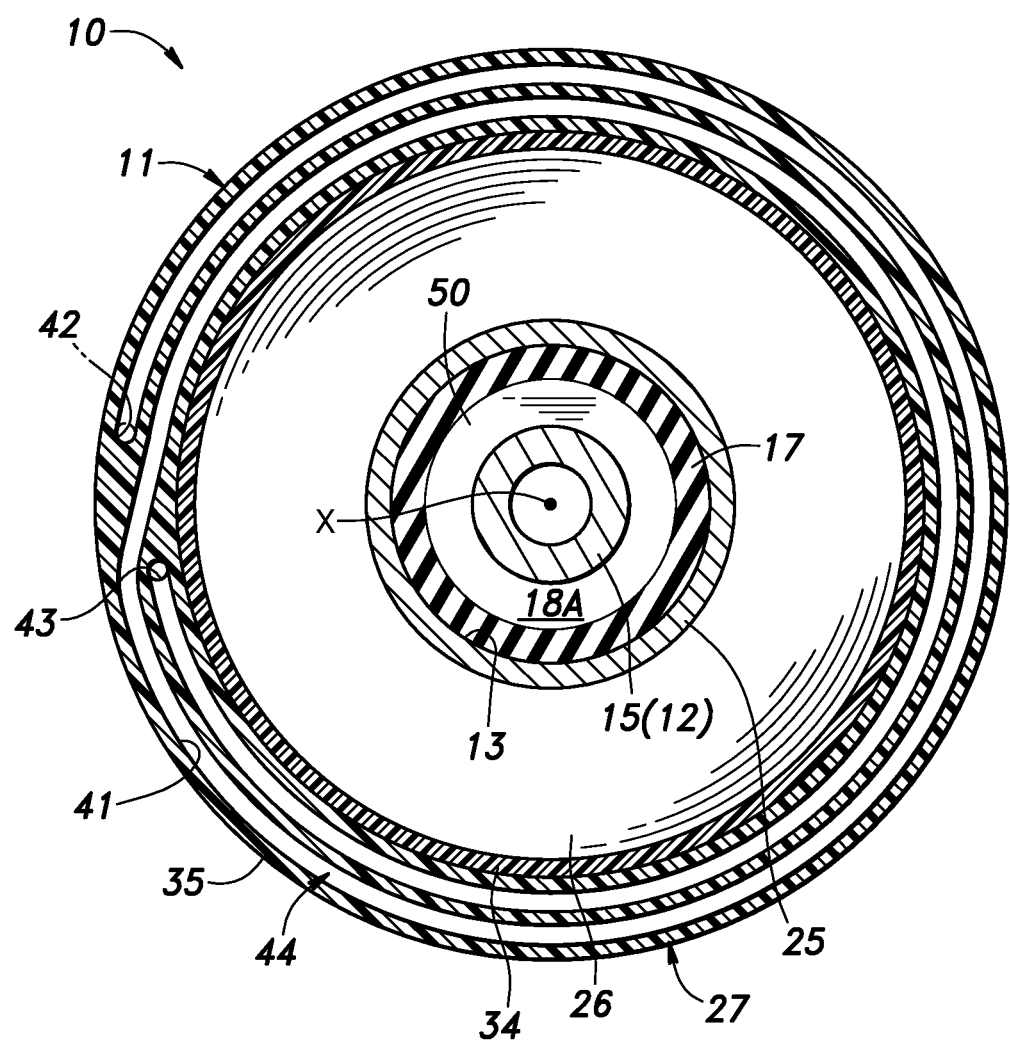
FIG. 9 is a sectional view, in a section corresponding to FIG. 3, of a variable stiffness vibration damping device according to still another embodiment of the present invention.

Also, in the above embodiments, as described with reference to FIG. 3, the circumferential passage 41 extends in the circumferential direction for an angle smaller than 360°. On the other hand, in other embodiments, as shown in FIG. 9, the circumferential passage 41 may extend in the circumferential direction for an angle equal to or larger than 360°. In such a case, at least a part in the circumferential direction of the circumferential passage 41 may have a multiplex configuration in which one portion formed inside in the radial direction and another portion formed outside in the radial direction overlap with each other in the circumferential direction. Accordingly, the first communication port 42 that communicates with an outer end in the radial direction of the circumferential passage 41 is formed in the upper outer yoke 36 not by a groove shown in FIG. 5 but by a through hole. By forming the circumferential passage 41 that extends for an angle equal to or larger than 360° and has a multiplex configuration, stiffness and damping characteristics in the axial direction of the vibration damping device 10 can be varied more greatly.

Further, in the above embodiments, the vibration damping devices 10 are used as the engine mounts in an engine support portion of the automobile 1, i.e. a vibration generating portion of the automobile 1. On the other hand, in other embodiments, the vibration damping device 10 can be applied to various portions that generate vibrations, for example, a motor support portion of the automobile 1, a suspension of the automobile 1, or a vibration generating portion of the device other than the automobile 1. In addition, a specific configuration, an arrangement, quantity, an angle, and the like of each member and each portion thereof shown in the above embodiments can be changed as appropriate within the scope of the present invention. Further, not all of the structural elements shown in the above embodiments are necessarily indispensable and they may be selectively adopted as appropriate. Also, the structures of the above embodiments may be combined as appropriate.

The invention claimed is:

1. A variable stiffness vibration damping device, comprising:
   an annular first support member defining an inner hole therein;
   a second support member including an axial portion penetrating through the inner hole of the first support member in an axial direction and a pair of outer flanges provided at both ends in the axial direction of the axial portion and spaced from the first support member at a prescribed interval in the axial direction;
   a pair of annular main elastic members connecting the first support member and each of the pair of outer flanges and defining a liquid chamber around the axial portion;
   an annular partition elastic member connecting an inner circumferential portion of the first support member and an outer circumferential portion of the axial portion and partitioning the liquid chamber into a first liquid chamber and a second liquid chamber;
   a communication passage provided in one of the first support member and the axial portion such that the first liquid chamber and the second liquid chamber communicate with each other via the communication passage, the communication passage including a circumferential passage extending in a circumferential direction;

a coil wound coaxially with and provided in the one of the first support member and the axial portion;

a yoke included in the one of the first support member and the axial portion and configured to form a magnetic gap overlapping at least partially with the circumferential passage; and a magnetic fluid filling the first liquid chamber, the second liquid chamber, and the communication passage, wherein the yoke includes an annular inner yoke and an annular outer yoke, the outer yoke being integrated with the inner yoke and surrounding the coil in cooperation with the inner yoke, wherein the axial direction is defined as a vertical direction, the outer yoke includes an outer passage forming member arranged at an intermediate portion in the axial direction of the outer yoke, an upper outer yoke, and a lower outer yoke, the upper outer yoke and the lower outer yoke being stacked in the axial direction with the outer passage forming member therebetween, and wherein the outer passage forming member is made of a non-magnetic material to form the magnetic gap and forms the circumferential passage.

2. The variable stiffness vibration damping device according to claim 1, wherein the first support member is provided with the communication passage, the coil, and the yoke.

3. The variable stiffness vibration damping device according to claim 1, wherein the circumferential passage is provided in the first support member in a circumferential range larger than 180°.

4. The variable stiffness vibration damping device according to claim 3, wherein the circumferential passage is provided in the first support member in a circumferential range equal to or larger than 360°.

5. The variable stiffness vibration damping device according to claim 1, wherein the circumferential passage is located on an outer circumferential side of the coil.

6. The variable stiffness vibration damping device according to claim 1, wherein the axial portion has a through hole penetrating therethrough in the axial direction.

7. The variable stiffness vibration damping device according to claim 1, wherein the partition elastic member is located at least partially in the inner hole of the first support member and extends in a direction substantially orthogonal to the axial direction.

8. The variable stiffness vibration damping device according to claim 1, wherein the yoke includes:
a passage forming member forming the circumferential passage; and
a pair of stacked members stacked in the axial direction with the passage forming member therebetween, and
magnetic permeability of the passage forming member is lower than that of the pair of stacked members.

* * * * *